United States Patent
Fleischhacker

(12) 
(10) Patent No.: US 10,476,156 B1
(45) Date of Patent: Nov. 12, 2019

(54) SUPERPOSITION OF ELECTROMAGNETIC FIELDS BY ANTENNA CURRENT PHASE ALIGNMENT

(71) Applicant: NXP B.V., Eindhoven (NL)

(72) Inventor: Jens Fleischhacker, Hamburg (DE)

(73) Assignee: NXP B.V., Eindhoven (NL)

( * ) Notice: Subject to any disclaimer, the term of this patent is extended or adjusted under 35 U.S.C. 154(b) by 77 days.

(21) Appl. No.: 15/983,364

(22) Filed: May 18, 2018

(51) Int. Cl.
*H01Q 3/26* (2006.01)
*H01Q 1/32* (2006.01)
*H04W 52/02* (2009.01)

(52) U.S. Cl.
CPC ......... *H01Q 3/2694* (2013.01); *H01Q 1/3283* (2013.01); *H04W 52/0261* (2013.01)

(58) Field of Classification Search
CPC combination set(s) only.
See application file for complete search history.

(56) References Cited

U.S. PATENT DOCUMENTS

| | | | |
|---|---|---|---|
| 8,976,005 B2 | 3/2015 | Zivkovic et al. | |
| 10,073,172 B2* | 9/2018 | Zielinski | G01S 13/756 |
| 2002/0067250 A1* | 6/2002 | Kamlah | B60R 25/00 340/436 |
| 2002/0198026 A1* | 12/2002 | Niemela | H04B 7/10 455/562.1 |
| 2003/0156068 A1* | 8/2003 | Hoetzel | B60R 25/245 343/713 |
| 2010/0231465 A1* | 9/2010 | Tanaka | B60R 25/2072 343/711 |
| 2011/0086600 A1 | 4/2011 | Muhammad | |
| 2014/0051364 A1 | 2/2014 | Simons | |
| 2015/0069940 A1* | 3/2015 | Lee | H02P 6/182 318/400.06 |
| 2016/0072495 A1* | 3/2016 | Shimura | H04B 17/12 327/236 |
| 2017/0046889 A1* | 2/2017 | Clemente | G07C 9/00007 |
| 2018/0035433 A1* | 2/2018 | Zielinski | H04B 17/102 |
| 2018/0084371 A1* | 3/2018 | Scagnol | G01S 5/0205 |

(Continued)

FOREIGN PATENT DOCUMENTS

EP 2741430 A1 6/2014

OTHER PUBLICATIONS

Atmel, "PEPS Driver and Immobilizer Base Station," ATA5291 Summary Datasheet, Nov. 2015, 6 pages.

(Continued)

*Primary Examiner* — Hoang-Chuong Q Vu

(57) ABSTRACT

A system for simultaneously driving a plurality of antennas for transmission of an electromagnetic wave includes a first terminal, a second terminal, a first driver coupled to the first terminal, and a second driver coupled to the second terminal. The system includes a circuit configured to generate an indication of a phase difference between a first current through the first terminal and a second current through the second terminal. The system includes a control circuit configured to enable the first driver and the second driver to concurrently drive a first signal through the first terminal and a second signal through the second terminal, respectively, and configured to adjust a delay between the first signal and the second signal based on the indication of the phase difference and a predetermined target phase difference.

20 Claims, 6 Drawing Sheets

(56) References Cited

U.S. PATENT DOCUMENTS

2019/0227141 A1\* 7/2019 Nishikawa .............. G01S 1/045
2019/0267709 A1\* 8/2019 Mow ........................ H01Q 3/28

OTHER PUBLICATIONS

Gaalaas, E., "Class D Audio Amplifiers: What, Why, and How," Analog Dialogue 40-06, Jun. 2006, pp. 1-7.
Texas Instruments, "TRF4140-Q1 Abstract Low-Frequency Transceiver for Immobilizer, Passive Start, Passive Entry, and Wireless Charging Systems," TRF4140-Q1, Jun. 2016, 12 pages.

\* cited by examiner

SUPERPOSITION OF ELECTROMAGNETIC FIELDS BY ANTENNA CURRENT PHASE ALIGNMENT

BACKGROUND

Field of the Invention

The invention relates to communications technology and more particularly to wireless communications systems using superposition of electromagnetic fields.

Description of the Related Art

In an exemplary communications application, multiple antennas are positioned around a vehicle to generate an electromagnetic field (e.g., a Low Frequency (LF) field generated using at least one signal having a frequency in the range of 20 kHz to 300 kHz) around the vehicle. A base station in the vehicle uses the electromagnetic field to locate a remote transceiver (e.g., a transceiver in a key fob) and to provide a user with access to the vehicle. Initially, the vehicle base station does not know the location of the remote transceiver and needs to quickly detect the location so the user does not experience a substantial latency. Although the vehicle includes multiple antennas for this purpose, to reduce power consumption, the conventional vehicle access system enables only one antenna at a time or enables only two antennas concurrently to generate an electromagnetic field from the superposition of electromagnetic fields generated by the two antennas. The vehicle base station may sequentially enable different individual antennas or different pairs of the antennas until detecting the remote transmitter. After detecting the remote transmitter, the vehicle base station may provide a user access to the vehicle in response to receiving a response from the remote transceiver that may be communicated using a constant wave signal or a modulated signal (e.g., a Manchester code modulated signal, non-return to zero (NRZ) coding).

Referring to FIG. 1, communications system 100 includes N antennas, where N is an integer greater than one, disposed around vehicle 104. Vehicle 104 includes base station 120, which sequentially selects and separately drives each of antennas 106, 108, and 110 to generate a corresponding electromagnetic field. Although remote transceiver 102 resides in a key fob that is proximate to vehicle 104, base station 120 may not detect it because remote transceiver 102 falls outside each of the individual electromagnetic fields generated by antenna 106, antenna 108, and antenna 110. Base station 120 increases a current through a driven antenna and may increase the electromagnetic field generated by the driven antenna enough to extend the electromagnetic field to detect remote transceiver 102. However, increasing the current that drives an antenna increases power consumption. Inclusion of additional antennas on the vehicle may reduce blind spots but increases system cost. Accordingly, improved techniques for generating electromagnetic fields in a communications system are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

Figure 1:
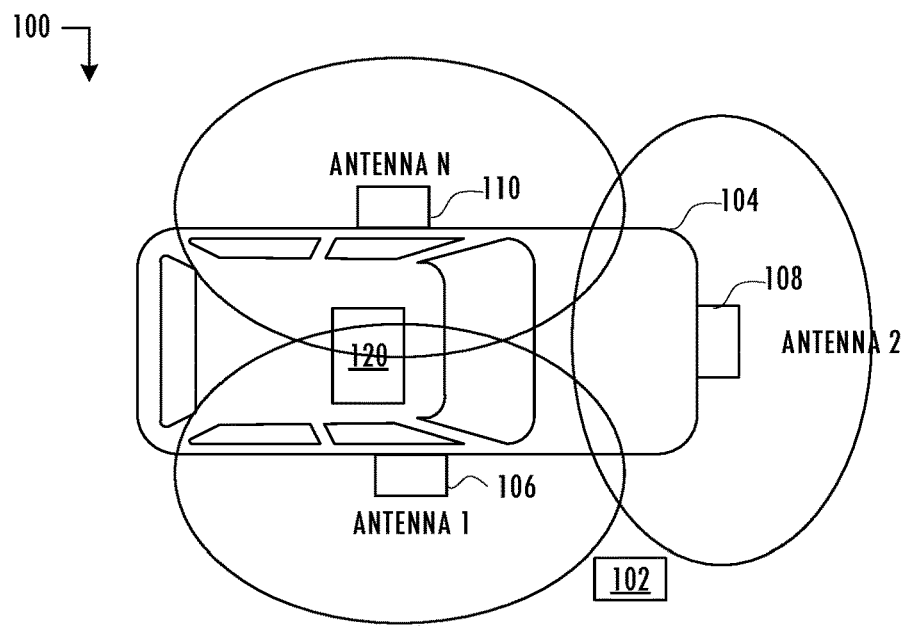
FIG. 1 illustrates a wireless communications system in an exemplary vehicle access application.
Figure 2:
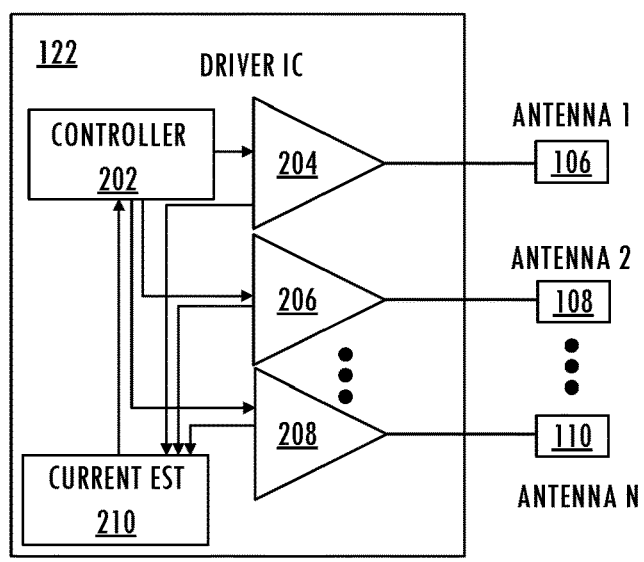
FIG. 2 illustrates a functional block diagram of an exemplary base station transmitter of the wireless communications system of FIG. 1.
Figure 3:
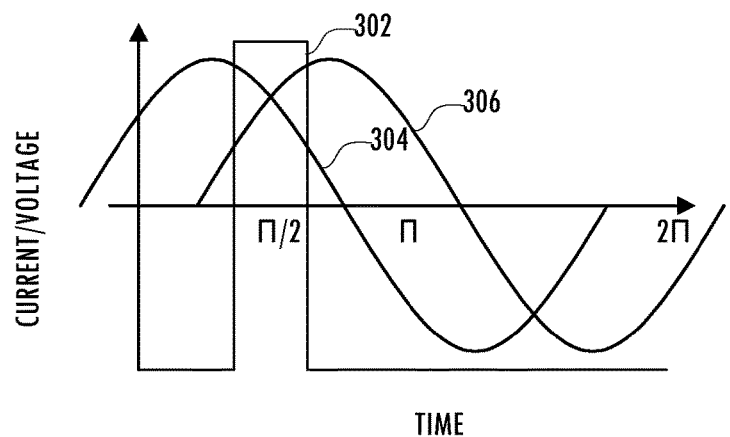
FIG. 3 illustrates exemplary waveforms for antenna signals generated by the base station transmitter of the wireless communications system of FIG. 1.
Figure 4:
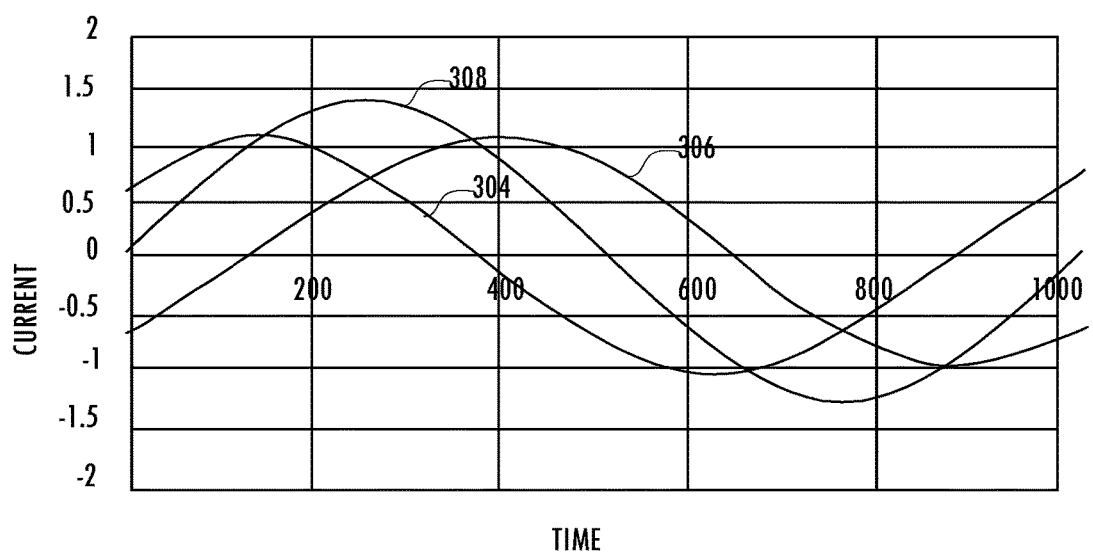
FIG. 4 illustrates exemplary waveforms for currents used by the base station transmitter of FIG. 2 to enable multiple antennas for superposition of electromagnetic fields.

Referring to FIGS. 1-4, base station 120 increases the electromagnetic field generated by system 100 using superposition of electromagnetic fields from concurrently driven pairs of proximate antennas. Base station 120 includes driver integrated circuit 122, which enables drivers 204, 206, and 208 to concurrently drive two antennas selected from a plurality of antennas of vehicle 104. Concurrently driving a pair of antennas generates two electromagnetic fields that may increase the electromagnetic field by superposition of electromagnetic fields. A conventional current estimator circuit 210 uses a shunt resistor configured to estimate a resulting peak-to-peak voltage that is a reproducible estimate for the magnitude of the antenna current. Controller 202 estimates currents driving each driven antenna to adjust amplitudes of the currents to be equal. However, note that this technique provides no phase information. Superposition of electromagnetic fields increases the signal range and may reduce activation time, which may reduce system power consumption. However, the electromagnetic fields generated by concurrently driven antennas may still have insufficient range or may inconsistently have sufficient range to detect the remote transceiver although the remote transceiver is proximate to vehicle 104.

Driver integrated circuit 122 drives a pair of selected antennas with voltages having the same phase and a predetermined voltage, as illustrated by voltage waveform 302. As a result, the antenna currents have predetermined amplitudes, but independent phases, as illustrated by antenna current waveform 304 and antenna current waveform 306. Thus, superposition of the resulting electromagnetic field can be out-of-phase, which reduces the effective electromagnetic field from a theoretical maximum electromagnetic field. In addition, any two antennas have at least some mismatch due to manufacturing variations, which may exacerbate the reduction in the effective electromagnetic field. If antenna current waveform 304 and antenna current waveform 306 each have an amplitude of one unit, superposition of those currents forms wave 308 having an amplitude of less than two units in response to a mismatch in phase of the two currents. As a result, the effective range of the resulting electromagnetic field is less than a theoretical maximum field, thereby reducing the reliability and effective range for detecting the remote transceiver. In general, mismatch of phases of currents through the driven antennas is not easily calibrated during production because the mismatch may vary according to environmental conditions (e.g., temperature) and/or according to properties of each individual antenna (e.g., aging or proximity to sheet metal).

Similar to the single driven antenna implementation, techniques for increasing the effective range of an electromagnetic field for detecting remote transceiver 102 of communications system 100 using an increased number of antennas disposed around vehicle 104. The increased number of antennas increases the electromagnetic field around vehicle 104, but also increases system cost. Another technique increases the antenna current to increase the electromagnetic field. However, that solution increases power consumption and may reduce the lifetime of batteries in the system.

Figure 5:
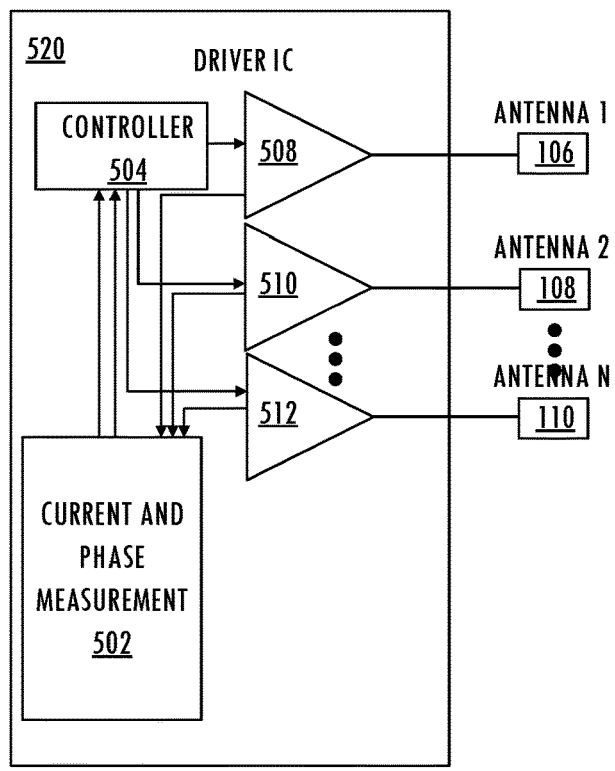
FIG. 5 illustrates a functional block diagram of an exemplary base station transmitter for the wireless communications system of FIG. 1, implementing superposition of electromagnetic fields consistent with at least one embodiment of the invention.
Figure 6:
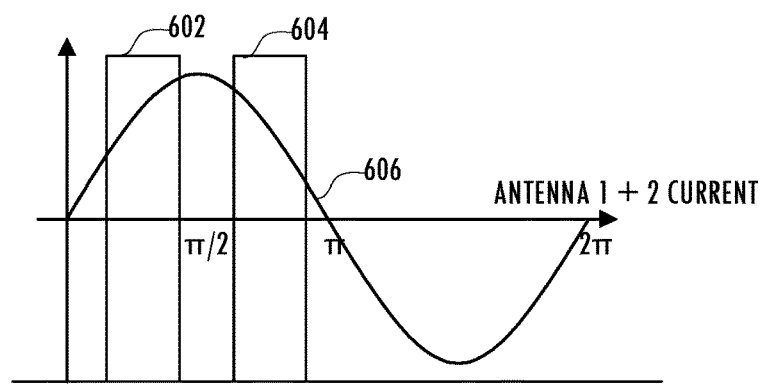
FIG. 6 illustrates exemplary waveforms for antenna signals generated by the base station transmitter of FIG. 5, consistent with at least one embodiment of the invention.
Figure 7:
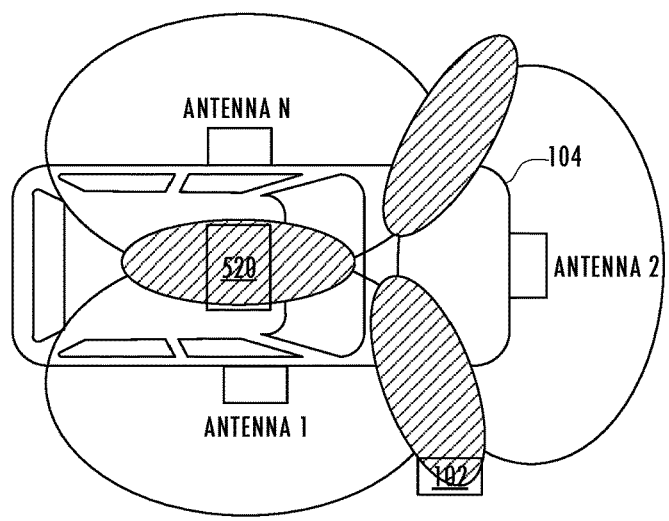
FIG. 7 illustrates antenna coverage of the base station transmitter of FIG. 5, consistent with at least one embodiment of the invention.

A technique that reliably generates an electromagnetic field by superposition of electromagnetic fields with an effective range that is at or near a maximum realizable range, aligns phases of the current driving the driven antennas. The radiated electromagnetic field strength from individual antennas is proportional to current distributed along the antenna. In an exemplary antenna (e.g., an antenna with a ferrite core), currents in the windings around the ferrite core are the driving current and driving multiple antennas with currents that have a negligible or no phase difference maximizes the radiated electromagnetic field resulting from the superposition of the electromagnetic fields. Referring to FIGS. 5-7, driver integrated circuit 520 includes a control loop that estimates a mismatch of the phase of the currents driven through the pair of driven antennas and adjusts the signals driving the operational antennas to reduce or eliminate the mismatch. The control loop increases a phase difference between the voltage signals applied to the driven antennas (e.g., increases the phase difference between antenna voltage 602 and antenna voltage 604) to reduce or eliminate any phase difference between the two corresponding currents 606 through the driven antennas. As a result, operation of the communications system improves by consistently increasing the electromagnetic field generated by superposition of the electromagnetic fields, thereby causing the effective range of the electromagnetic field to reliably approach or equal a maximum achievable electromagnetic field using those driven antennas. Thus, base station 520 is more likely to detect the remote transceiver when it is proximate to vehicle 104 than base station 120 of FIG. 1.

Figure 12:
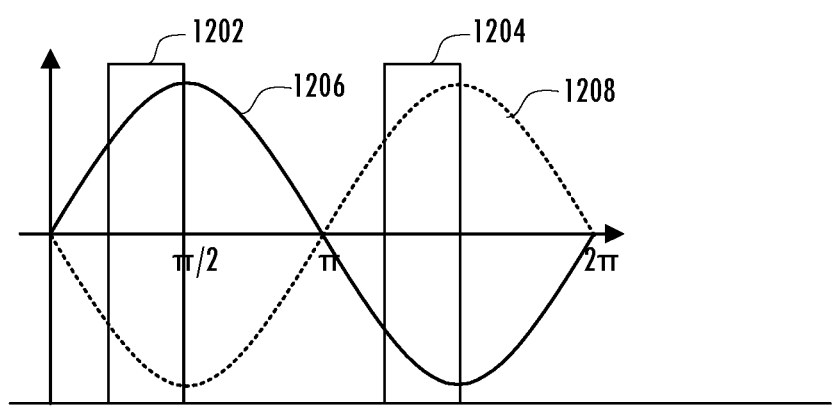
FIG. 12 illustrates exemplary waveforms for antenna signals generated by the base station transmitter of FIG. 5 for a phase alignment of 180 degrees, consistent with at least one embodiment of the invention.

In other embodiments, rather than implementing a phase alignment of zero degrees between the phases of the currents driven through the driven antennas, the control loop adjusts the voltage signals applied to the driven antennas to implement a predetermined target phase difference (e.g., a phase difference of 180 degrees of FIG. 12) between the phases of the currents. For example, the control loop adjusts at least one of antenna voltage 1202 and antenna voltage 1204 to implement a phase difference of 180 degrees between antenna current 1206 and antenna current 1208. The predetermined value may be selected according to the target application (e.g., according to mounting positions of the associated antennas) and stored in memory for use in generating a digital phase adjustment code for at least one of the driven antennas, as described further below. For example, the mounting positions of the driven antennas determines whether a difference between the phases of the currents of zero degrees causes superposition of the corresponding electromagnetic fields or cancellation of the electromagnetic fields. In some embodiments of the communications system, a predetermined target phase difference of 180 degrees obtains superposition of the electromagnetic fields instead of cancellation.

Figure 8:
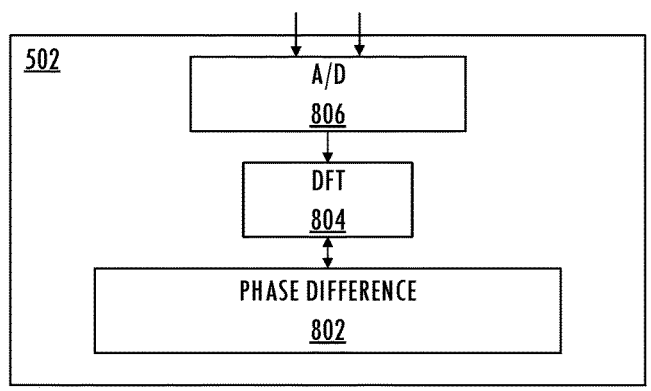
FIG. 8 illustrates a functional block diagram of an exemplary current and phase measurement coprocessor of the base station transmitter of FIG. 5, consistent with at least one embodiment of the invention.
Figure 9:
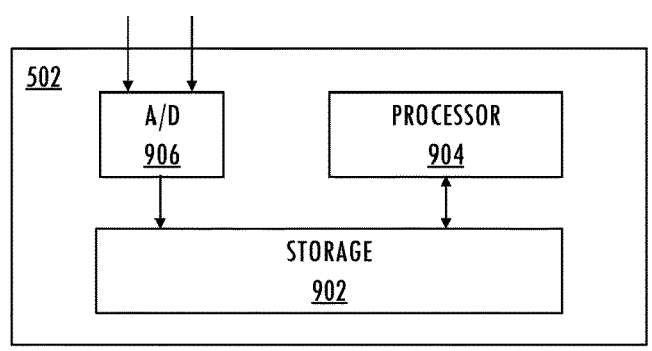
FIG. 9 illustrates a functional block diagram of an exemplary current and phase measurement coprocessor including a processor configured to execute instructions stored in memory of the base station transmitter of FIG. 5, consistent with at least one embodiment of the invention.

Referring to FIGS. 8 and 9, in at least one embodiment, rather than only estimating an amplitude of antenna current using a peak-to-peak voltage measurement, as described above, base station 520 includes current and phase measurement coprocessor 502, which includes an analog-to-digital converter 806 that samples current through each antenna driver, generates a digital time domain representation of the current through each antenna driver, and provides the digital data to storage or to logic for further processing. Current and phase measurement coprocessor 502 may use a correlation of the digital time domain signals to determine an average phase difference between the two digital time domain signals or determine a timing difference, e.g., a difference in corresponding zero crossings or current maxima of magnitudes of the two digital time domain signals. However, those time-domain techniques for determining a phase difference are sensitive to noise. In another embodiment, current and phase measurement coprocessor 502 converts each of the digital representations of antenna current from time domain signals to frequency domain signals (e.g., using discrete Fourier transform circuit 804). Circuitry uses the digital frequency domain signal to identify the phase difference by determining an angle between phase information for fundamental frequencies of the driven antennas. In applications that use constant frequency signals, this approach rejects noise and interference from other frequencies.

Current and phase measurement coprocessor 502 may determine an indication of the phase difference by using application-specific, custom-designed digital circuitry or by using a processor configured to execute one or more software routines including instructions executable to generate an indication of the phase difference. Referring to FIG. 8, a discrete Fourier transform circuit 804 converts digital time domain representations of antenna current stored into digital frequency domain representations, which may be stored intermediate buffers (not shown). Discrete Fourier transform circuit 804 may calculate the frequency domain symbols for each driven antenna in parallel or may alternate between calculations for each of the driven antennas. Phase difference calculator 802 compares the data for the driven antennas to generate an angle between the two signals to estimate the phase difference. Other techniques for estimating the phase difference include measuring a time between a zero crossing of a digital or analog time domain representation of current driven through an antenna and a zero-crossing of another digital or analog time domain representation of current driven through another antenna. However, such technique may be more accurate in embodiments that use Class AB drivers, which drive signals including the fundamental frequency, as compared to embodiments that use Class D drivers, which drive signals that include additional harmonics that may cause distortion of zero-crossings.

Referring to FIG. 9, in at least one embodiment of current and phase measurement coprocessor 502, analog-to-digital converter 906 samples current through each antenna driver, generates a digital time domain representation of the current through each antenna driver, and provides the digital data to storage 902. Processor 904 (e.g., a digital signal processor or general-purpose processor) is configured to execute one or more software routine (e.g., firmware) stored in storage 902 that are executable on processor 904 to compute an estimate of a phase difference between the currents driven through the antennas using a cross-correlation or Fourier transform technique described above. However, note that the implementation of FIG. 9 may be more expensive and complex than implementations consistent with FIG. 8.

Controller 504 receives the phase difference estimate from current and phase measurement coprocessor 502 and computes a digital phase adjustment code for at least one of the driven antennas. The digital phase adjustment code is used to delay at least one of the signals that drives the driven antennas, thereby adjusting the phase difference between the currents through the driven antennas to achieve a predetermined target phase difference (e.g., a phase difference of zero degrees or a phase difference of 180 degrees). The digital phase adjustment code may be generated using a predetermined lookup table stored in memory or by computational techniques based on predetermined parameters or conversion factors stored in memory. Controller 504 may provide a separate phase adjustment code for adjusting each antenna current of multiple driven antennas or may provide a phase adjustment code for adjusting the antenna current of only one of the driven antennas.

Figure 10:
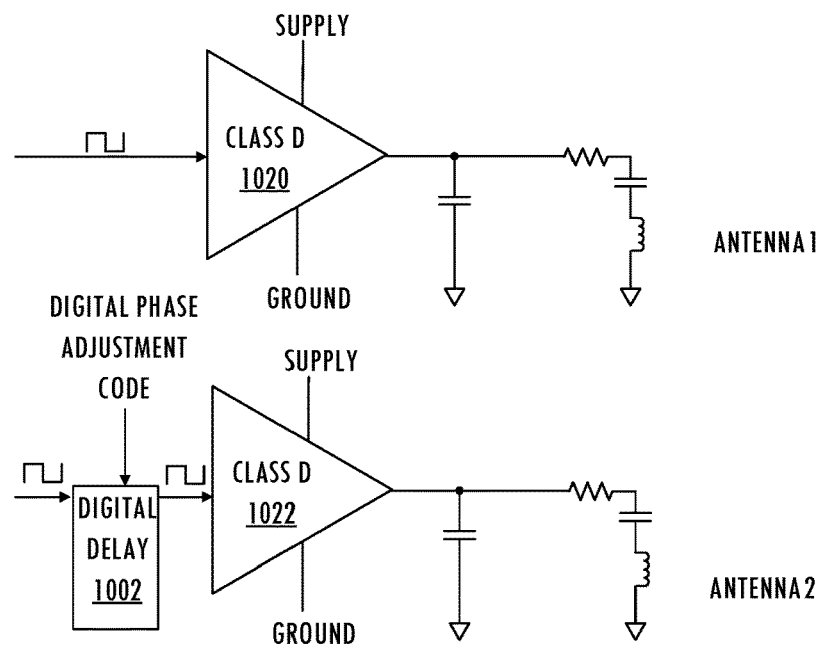
FIG. 10 illustrates a functional block diagram of exemplary class D amplifier driver circuits of the base station transmitter of FIG. 5, consistent with at least one embodiment of the invention.

Referring to FIGS. 5 and 10, in at least one embodiment, a pair of drivers selected from drivers 508, 510, and 512 includes switched amplifier 1020 and switched amplifier 1022 configured as class D driver circuits. Accordingly, a digital phase adjustment code may be used to change the phase difference between the driver voltages applied to switched amplifier 1020 and switched amplifier 1022 by delaying at least one of the signals, e.g., digitally shifting (within an allowed window) the digital input signal for a corresponding driver selected to drive an antenna. An exemplary delay circuit provides a selectable amount of delay (e.g., $2^8$, =256 delay steps selectable by an eight-bit digital code), which may be provided using a delay line of selectable buffer devices, selectable state elements, or other selectable circuit elements. In at least one embodiment, control circuit 502 selectively enables different phases of a multiphase digital voltage signal based on the digital phase adjustment code and provides those difference phases of the digital voltage signal to drive corresponding antennas of a pair of operational antennas to adjust the phase difference between the first current and the second current through the antenna drivers. After the control circuit adjusts the delay using the digital phase adjustment code, the phase difference between the first current and the second current of the operational antennas is within +/−10%.

Figure 11:
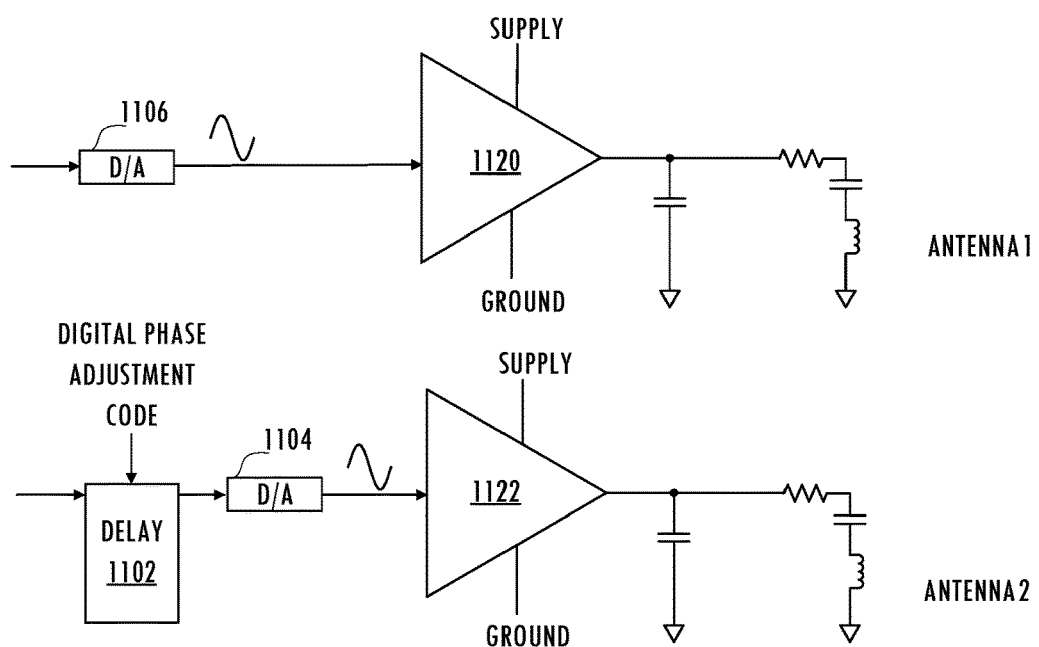
FIG. 11 illustrates a functional block diagram of exemplary class AB amplifier driver circuits of the base station transmitter of FIG. 5, consistent with at least one embodiment of the invention.

Referring to FIGS. 5 and 11, in at least one embodiment, a pair of drivers selected from drivers 508, 510, and 512 includes amplifier circuit 1120 and amplifier circuit 1122, which may be a class AB amplifier or a linear amplifier configured as linear driver circuits. This implementation requires digital-to-analog converter 1104 and digital-to-analog converter 1106 to convert corresponding data signals to provide a sinusoidal signal to the corresponding drivers of the driven antennas. Accordingly, the digital phase adjustment code may be used to adjust the delay provided by delay circuit 1102. In general, the implementation of FIG. 11 is more expensive than the implementation of FIG. 10 due to inclusion of digital-to-analog converter 1104 and digital-to-analog converter 1106. Note that in general, the Class D amplifier solution of FIG. 10 is more power efficient, capable of driving higher power signals, and is less complex and expensive to implement than Class AB amplifier embodiments consistent with FIG. 11.

In at least one embodiment, a system for simultaneously driving a plurality of antennas for generation of an electromagnetic field includes a first terminal, a second terminal, a first driver coupled to the first terminal, and a second driver coupled to the second terminal. The system includes a circuit configured to generate an indication of a phase difference between a first current through the first terminal and a second current through the second terminal. The system includes a control circuit configured to enable the first driver and the second driver to concurrently drive a first signal through the first terminal and a second signal through the second terminal, respectively, and configured to adjust a delay between the first signal and the second signal based on the indication of the phase difference and a predetermined target phase difference. The system may include a first antenna coupled to the first terminal. The first antenna may be configured to transmit a first LF signal in response to the first signal. The system may include a second antenna coupled to the second terminal. The second antenna may be configured to transmit a second LF signal in response to the second signal.

The circuit may include a discrete-Fourier transform circuit configured to compute a first digital frequency domain representation of the first signal and a second digital frequency domain representation of the second signal based on a digital version of the first signal and a digital version of the second signal. The circuit may include a digital circuit configured to generate the indication of the phase difference based on the first digital frequency domain representation and the second digital frequency domain representation. The circuit may include a storage circuit and a processor configured to execute instructions stored in the storage element. The instructions are executable by the processor to cause the processor to compute the indication of the phase difference based on a digital version of the first signal and a digital version of the second signal. The circuit may include a selectable delay element configured to provide a delayed data signal based on a digital data signal and a digital-to-analog converter circuit configured to convert the delayed data signal to an analog delayed data signal. The circuit may provide the analog delayed data signal as one of the first signal and the second signal. The first driver and the second driver may each comprise a class AB amplifier circuit. The system may include a selectable delay element configured to provide a delayed data signal as one of the first signal and the second signal based on a digital delay code and a data signal. The first driver and the second driver may each comprise a class D amplifier circuit.

The predetermined target phase difference may be zero degrees, and after the control circuit adjusts the delay, the phase difference between the first current and the second current may be within +/−10%. The system may include a plurality of terminals. The control circuit may be configured to select the first terminal and the second terminal from the plurality of terminals. Other terminals of the plurality of terminals may be disabled while the first terminal and the second terminal are selected. The system may include a vehicle and a plurality of antennas positioned at locations around the vehicle to transmit a signal to a remote transceiver. The signal may be a superposition of a first LF signal based on the first signal and a second LF signal based on the second signal. The predetermined target phase difference may be zero degrees and the first LF signal and the second LF signal may have the same phase. The system may include a remote transceiver configured to receive a superposition of the first LF signal and the second LF signal.

In at least one embodiment, a method increases a range of an electromagnetic field generated using multiple antennas. The method includes driving a first antenna by a first driver using a first signal and driving a second antenna by a second driver using a second signal. The second signal is driven concurrently with the first signal. The method includes determining a phase difference between a first current through the first driver and a second current through the second driver. The method includes adjusting at least one of the first signal and the second signal based on the phase difference and a predetermined target phase difference. The adjusting may include generating a phase compensation signal based on the phase difference and the predetermined target phase difference. The adjusting may include delaying at least one of the first signal and the second signal using the phase compensation signal.

The phase difference may be determined based on a time difference between a first maxima of a first magnitude of the first current and a second maxima of a second magnitude of the second current. The phase compensation signal may be a digital signal indicating an amount of delay selected to be inserted into a first pulse train of the first signal or a second pulse train of the second signal. Determining the phase difference may include sensing the first current through the first driver, sensing the second current through the second driver, generating a first digital frequency domain representation of the first current, and generating a second digital frequency domain representation of the second current. The phase difference may be determined based on the first digital frequency domain representation and the second digital frequency domain representation. The predetermined target phase difference may be zero degrees and after the adjusting, the phase difference between the first current and the second current may be within +/−10%. The predetermined target phase difference may be zero degrees and after the adjusting, the phase difference between the first current and the second current may be negligible. The first antenna and the second antenna may transmit a first LF signal and a second LF signal, respectively, the predetermined target phase difference may be zero degrees and the first LF signal and the second LF signal may have the same phase. The method may include selecting the first antenna and the second antenna from a plurality of antennas positioned at locations around a vehicle. Driving the first antenna and driving the second antenna may cause transmission of a signal to a remote transceiver. The signal may be a superposition of a first LF signal based on the first signal and a second LF signal based on the second signal. The predetermined target phase difference may be zero degrees and the first LF signal and the second LF signal may have the same phase.

In at least one embodiment, a method for increasing a range of an electromagnetic field generated using multiple antennas includes concurrently driving a first antenna by a first driver and a second antenna by a second driver using a first signal and a second signal, respectively, and delaying at least one of the first signal and the second signal based on a predetermined target phase difference and a phase difference between a first current through the first driver and a second current through the second driver.

Thus, techniques for superposition of electromagnetic fields using antenna current alignment have been disclosed. The techniques determine a phase difference between antenna currents and compensate for that phase difference by driving the corresponding antennas with drive voltage signals that align the phases of the antenna currents according to a predetermined target phase difference. The technique may reduce blind spots in the coverage area of an electromagnetic field in the communications system and increases the accuracy of superposition of electromagnetic fields, thereby increasing the communications distance and field coverage around a vehicle, without increasing a number of antennas or a substantial increase in power consumption. The increased reproducibility may reduce the margins required to develop a reliable system.

Unless stated otherwise, terms such as "first" and "second" are used to arbitrarily distinguish between the elements such terms describe. Thus, these terms are not necessarily intended to indicate temporal or other prioritization of such elements.

Although the invention is described herein with reference to specific embodiments, various modifications and changes can be made without departing from the scope of the present invention as set forth in the claims below. For example, while the invention has been described in an embodiment of a passive keyless entry automotive application, one of skill in the art will appreciate that the teachings herein can be utilized with other communications applications. In addition, although the current phase alignment technique is described in a system that selectively enables two antennas for concurrent operation, other embodiments of the current phase alignment technique applies to concurrent operation of greater numbers of antennas. Moreover, although the current phase alignment technique is described in a system that uses LF signals, other signals in other frequency ranges may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A system for simultaneously driving a plurality of antennas for generation of an electromagnetic field, the system comprising:
   a first terminal;
   a second terminal;
   a first driver coupled to the first terminal;
   a second driver coupled to the second terminal;
   a circuit configured to generate an indication of a phase difference between a first current through the first terminal and a second current through the second terminal; and a control circuit configured to enable the first driver and the second driver to concurrently drive a first signal through the first terminal and a second signal through the second terminal, respectively, and configured to adjust a delay between the first signal and the second signal based on the indication of the phase difference and a predetermined target phase difference.

2. The system, as recited in claim 1, further comprising:
a first antenna coupled to the first terminal, the first antenna being configured to transmit a first Low Frequency (LF) signal in response to the first signal; and
a second antenna coupled to the second terminal, the second antenna being configured to transmit a second LF signal in response to the second signal.

3. The system, as recited in claim 1, wherein the circuit comprises:
a discrete-Fourier transform circuit configured to compute a first digital frequency domain representation of the first signal and a second digital frequency domain representation of the second signal based on a digital version of the first signal and a digital version of the second signal; and
a digital circuit configured to generate the indication of the phase difference based on the first digital frequency domain representation and the second digital frequency domain representation.

4. The system, as recited in claim 1, wherein the circuit comprises:
a storage circuit; and
a processor configured to execute instructions stored in the storage circuit, the instructions being executable by the processor to cause the processor to compute the indication of the phase difference based on a digital version of the first signal and a digital version of the second signal.

5. The system, as recited in claim 1, further comprising:
a selectable delay element configured to provide a delayed data signal based on a digital data signal; and
a digital-to-analog converter circuit configured to convert the delayed data signal to an analog delayed data signal and to provide the analog delayed data signal as one of the first signal and the second signal,
wherein the first driver and the second driver each comprise a class AB amplifier circuit.

6. The system, as recited in claim 1, further comprising:
a selectable delay element configured to provide a delayed data signal as one of the first signal and the second signal based on a digital delay code and a data signal; and
wherein the first driver and the second driver each comprise a class D amplifier circuit.

7. The system, as recited in claim 1, wherein the predetermined target phase difference is zero degrees and after the control circuit adjusts the delay, the phase difference between the first current and the second current is within +/−10%.

8. The system, as recited in claim 1, further comprising:
a plurality of terminals,
wherein the control circuit is configured to select for operation the first terminal and the second terminal from the plurality of terminals; and,
wherein other terminals of the plurality of terminals are disabled while the first terminal and the second terminal are selected for operation.

9. The system, as recited in claim 8, further comprising:
a vehicle; and
a plurality of antennas positioned at locations around the vehicle to transmit a signal to a remote transceiver, the signal being a superposition of a first Low Frequency (LF) signal based on the first signal and a second LF signal based on the second signal, the predetermined target phase difference being zero degrees, and the first LF signal and the second LF signal having the same phase.

10. The system, as recited in claim 9, further comprising:
a remote transceiver configured to receive a superposition of the first LF signal and the second LF signal.

11. A method for increasing a range of an electromagnetic field generated using multiple antennas, the method comprising:
driving a first antenna by a first driver using a first signal;
driving a second antenna by a second driver using a second signal, the second signal being driven concurrently with the first signal;
determining a phase difference between a first current through the first driver and a second current through the second driver; and
adjusting at least one of the first signal and the second signal based on the phase difference and a predetermined target phase difference.

12. The method, as recited in claim 11, wherein the adjusting comprises:
generating a phase compensation signal based on the phase difference and the predetermined target phase difference; and
delaying at least one of the first signal and the second signal using the phase compensation signal.

13. The method, as recited in claim 12, wherein the phase compensation signal is a digital signal indicating an amount of delay selected to be inserted into a first pulse train of the first signal or a second pulse train of the second signal.

14. The method, as recited in claim 11, wherein the phase difference is determined based on a time difference between a first maxima of a first magnitude of the first current and a second maxima of a second magnitude of the second current.

15. The method, as recited in claim 11, wherein determining the phase difference comprises:
sensing the first current through the first driver;
sensing the second current through the second driver;
generating a first digital frequency domain representation of the first current; and
generating a second digital frequency domain representation of the second current,
wherein the phase difference is determined based on the first digital frequency domain representation and the second digital frequency domain representation.

16. The method, as recited in claim 11, wherein the predetermined target phase difference is zero degrees, and after the adjusting, the phase difference between the first current and the second current is within +/−10%.

17. The method, as recited in claim 11, wherein the predetermined target phase difference is zero degrees and after the adjusting, the phase difference between the first current and the second current is negligible.

18. The method, as recited in claim 11, wherein the first antenna and the second antenna transmit a first LF signal and a second LF signal, respectively, the predetermined target phase difference being zero degrees and the first LF signal and the second LF signal having the same phase.

19. The method, as recited in claim 11, further comprising:

selecting the first antenna and the second antenna from a plurality of antennas positioned at locations around a vehicle, wherein the predetermined target phase difference is zero degrees and driving the first antenna and driving the second antenna cause transmission of a signal to a remote transceiver, the signal being a superposition of a first Low Frequency (LF) signal based on the first signal and a second LF signal based on the second signal, the first LF signal and the second LF signal having the same phase.

20. A method for increasing a range of an electromagnetic field generated using multiple antennas, the method comprising:

concurrently driving a first antenna by a first driver and a second antenna by a second driver using a first signal and a second signal, respectively; and delaying at least one of the first signal and the second signal based on a predetermined target phase difference and a phase difference between a first current through the first driver and a second current through the second driver.

* * * * *